US010555054B2

(12) United States Patent
Byers et al.

(10) Patent No.: US 10,555,054 B2
(45) Date of Patent: Feb. 4, 2020

(54) ON-DEMAND MODULAR FOG COMPUTING RESOURCES

(71) Applicant: Cisco Technology, Inc., San Jose, CA (US)

(72) Inventors: Charles Calvin Byers, Wheaton, IL (US); Gonzalo Salgueiro, Raleigh, NC (US); Joseph Michael Clarke, Raleigh, NC (US); Carlos M. Pignataro, Raleigh, NC (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 968 days.

(21) Appl. No.: 15/096,337

(22) Filed: Apr. 12, 2016

(65) Prior Publication Data

US 2017/0295109 A1 Oct. 12, 2017

(51) Int. Cl.
*H04Q 1/00* (2006.01)
(52) U.S. Cl.
CPC ..................................... *H04Q 1/00* (2013.01)
(58) Field of Classification Search
CPC ....................................................... H04Q 1/00
See application file for complete search history.

(56) References Cited

U.S. PATENT DOCUMENTS

| | | | | |
|---|---|---|---|---|
| 7,974,079 | B2 * | 7/2011 | Miller | F16M 11/42 135/88.13 |
| 8,280,547 | B2 * | 10/2012 | D'Andrea | B66F 9/063 700/214 |
| 9,087,314 | B2 * | 7/2015 | Hoffman | G06Q 10/087 |
| 9,540,121 | B2 * | 1/2017 | Byers | B64C 39/024 |
| 10,133,267 | B2 * | 11/2018 | Wurman | G05B 19/4189 |
| 10,205,871 | B1 * | 2/2019 | Goyal | H04N 21/4728 |
| 10,207,868 | B1 * | 2/2019 | Stubbs | G06Q 10/087 |
| 10,209,682 | B1 * | 2/2019 | Hebert | G05B 13/00 |
| 10,217,074 | B1 * | 2/2019 | Stallman | G06Q 10/08 |
| 10,248,120 | B1 * | 4/2019 | Siegel | G05D 1/0088 |
| 10,308,430 | B1 * | 6/2019 | Brady | B65G 1/1373 |
| 10,310,499 | B1 * | 6/2019 | Brady | G05D 1/0027 |
| 10,322,801 | B1 * | 6/2019 | Yeturu | B64C 39/024 |
| 10,338,895 | B2 * | 7/2019 | Zhang | G06F 8/34 |
| 10,364,099 | B1 * | 7/2019 | Brazeau | B65G 1/10 |
| 10,399,772 | B1 * | 9/2019 | Brazeau | B65G 1/06 |
| 10,405,260 | B2 * | 9/2019 | Zavesky | H04W 4/027 |

(Continued)

*Primary Examiner* — Lisa Lea-Edmonds
(74) *Attorney, Agent, or Firm* — Behmke Innovation Group LLC; James Behmke; Stephen D. LeBarron

(57) ABSTRACT

In one embodiment, an autonomous carrier transports a fog computing module to an enclosure at a location determined to be in need of a particular fog computing resource, and aligns and anchors the fog computing module to the enclosure, where the aligning and anchoring is based on mating mechanical connectors on the fog computing module and enclosure. One or more electronic components of the fog computing module may then interface to the enclosure due to the anchoring, and the fog computing module activates at the location, accordingly. In one particular embodiment, the particular fog computing resource of the fog computing module is an additive resource to an existing fog computing resource module at the enclosure, and the existing fog computing resource module provides the mechanical connectors and interfaced electronic components of the enclosure.

25 Claims, 11 Drawing Sheets

(56) References Cited

U.S. PATENT DOCUMENTS

| | | | | |
|---|---|---|---|---|
| 10,419,106 B1* | 9/2019 | Liu | ................. | H04L 67/104 |
| 2014/0257553 A1* | 9/2014 | Shakes | ............. | G06Q 10/08 |
| | | | | 700/216 |
| 2016/0357524 A1* | 12/2016 | Maluf | ................. | G06F 8/34 |
| 2017/0158430 A1* | 6/2017 | Raizer | ................ | B65G 1/04 |
| 2019/0041824 A1* | 2/2019 | Chavez | ........... | G06F 11/2023 |

* cited by examiner

ON-DEMAND MODULAR FOG COMPUTING RESOURCES

TECHNICAL FIELD

The present disclosure relates generally to computer networks, and, more particularly, to on-demand modular fog computing resources.

BACKGROUND

Fog computing is a distributed approach of cloud implementation that acts as an intermediate layer from local networks (e.g., Internet of Things or "IoT" networks) to the cloud (e.g., centralized and/or shared resources). Current proposals and implementations are generally static in nature, where the fog network is designed and implemented prior to providing a set of pre-defined services (e.g., connectivity to cloud, data analytics, etc.).

Additionally, many of fog's IoT (or Internet of Everything or "IoE") applications require high availability and/or non-stop operation. Even the few minutes of downtime needed to upgrade or replace hardware modules can cause unacceptable service outages. Some IoE use situations create short-term spikes in the load on specific fog nodes. For example, during a special event, big game, festival, or network maintenance activities, a city's or building's infrastructure nodes near the event may be taxed well beyond their design capacity. Many fog applications can't afford the expense, physical volume, or power dissipation increases that accompany fully duplicated system hardware, or providing capacity in excess of some nominal load.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
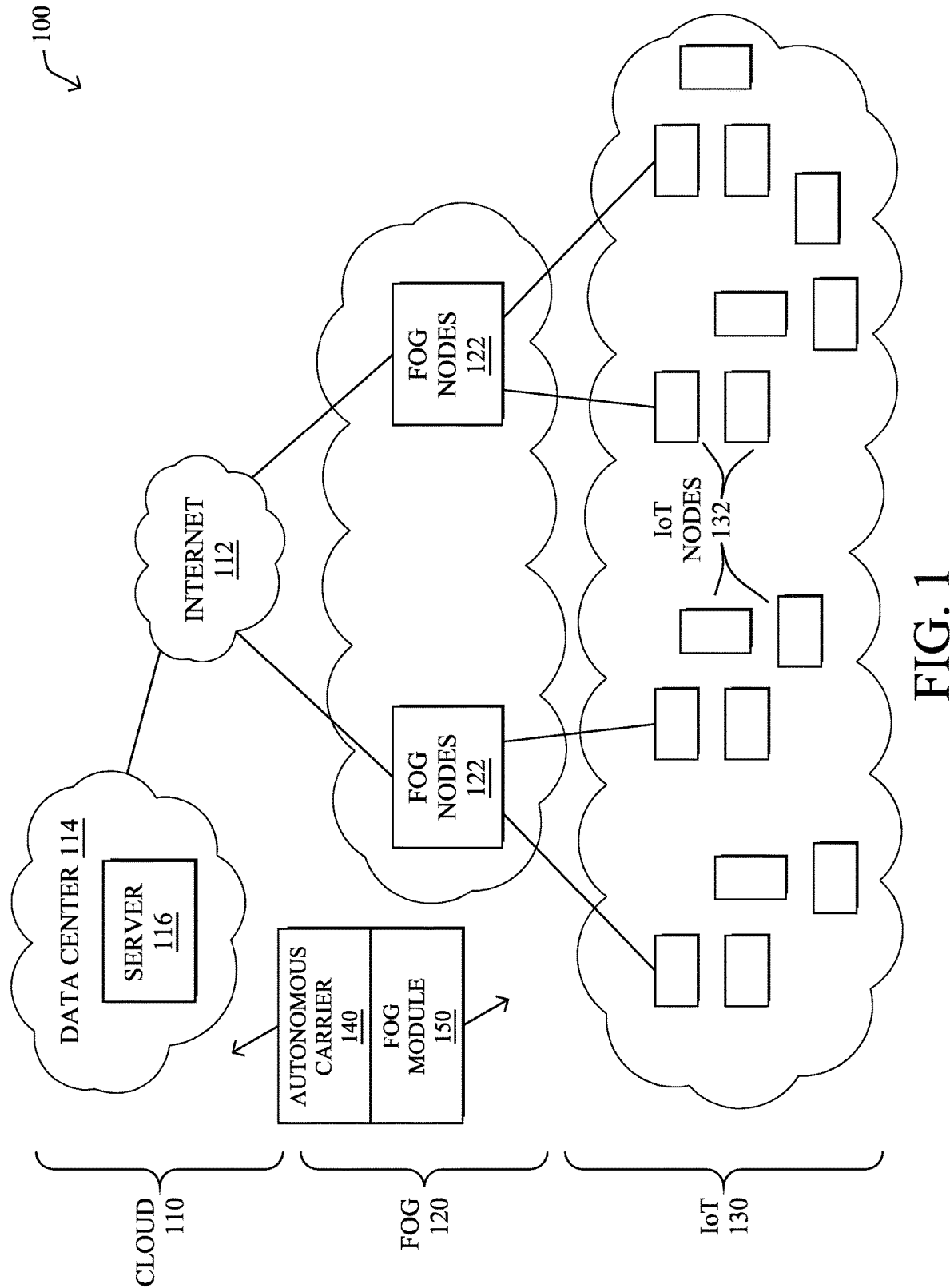
FIG. 1 illustrates an example computer network.

According to one or more embodiments of the disclosure, an autonomous carrier/vehicle transports a fog computing module to an enclosure at a location determined to be in need of a particular fog computing resource, and aligns and anchors the fog computing module to the enclosure, where the aligning and anchoring is based on mating mechanical connectors on the fog computing module and enclosure. One or more electronic components of the fog computing module may then interface to the enclosure due to the anchoring, and the fog computing module activates at the location, accordingly. In one particular embodiment, the particular fog computing resource of the fog computing module is an additive resource to an existing fog computing resource module at the enclosure, and the existing fog computing resource module provides the mechanical connectors and interfaced electronic components of the enclosure.

According to one or more additional embodiments of the disclosure, an enclosure apparatus has a secure outer enclosure casing and an access panel on the outer enclosure casing that is accessible by an authorized autonomous carrier. Mating mechanical connectors within the enclosure are accessible to the authorized autonomous carrier via the access panel, and are configured to provide alignment and anchoring of a fog computing module by the authorized autonomous carrier, the aligning and anchoring based on reciprocal mating mechanical connectors on the fog computing module. One or more electronic components of the enclosure are configured to interface with one or more reciprocal electronic components of the fog computing module due to the anchoring, where at least one of the one or more electronic components is configured to supply power to the fog computing module sufficient for the fog computing module to activate at a location of the enclosure and provide a particular fog computing resource at the location (e.g., where the enclosure is a roadside module receptacle, a pole-top module receptacle, a building-top module receptacle, a building-side garage-based module receptacle, etc.).

According to one or more further embodiments of the disclosure, a fog computing module, which may comprise a processor and memory configured to provide one or more fog computing resources, has mating mechanical connectors configured to provide alignment and anchoring of the fog computing module by an autonomous carrier into an enclosure, the aligning and anchoring based on reciprocal mating mechanical connectors within the enclosure. Then, one or more electronic components are configured to interface with one or more reciprocal electronic components within the enclosure due to the anchoring, where at least one of the one or more electronic components is configured to receive power from the enclosure sufficient to activate the fog computing resources at a location of the enclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, displays, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer or layers from local networks (e.g., IoT networks) to the cloud (e.g., centralized and/or shared resources, as will be understood by those skilled in the art). That is, generally, fog computing entails using devices at the network edge to provide application services to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT 130 (note that "fog" may be considered part of the IoT network 130, such that portion 130 refers more specifically to the "things" or "intelligent things"). Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices/nodes 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

In addition, and as described further below, one or more autonomous carriers 140 may be configured to carry one or more fog modules 150 for installation and activation within the network 100.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
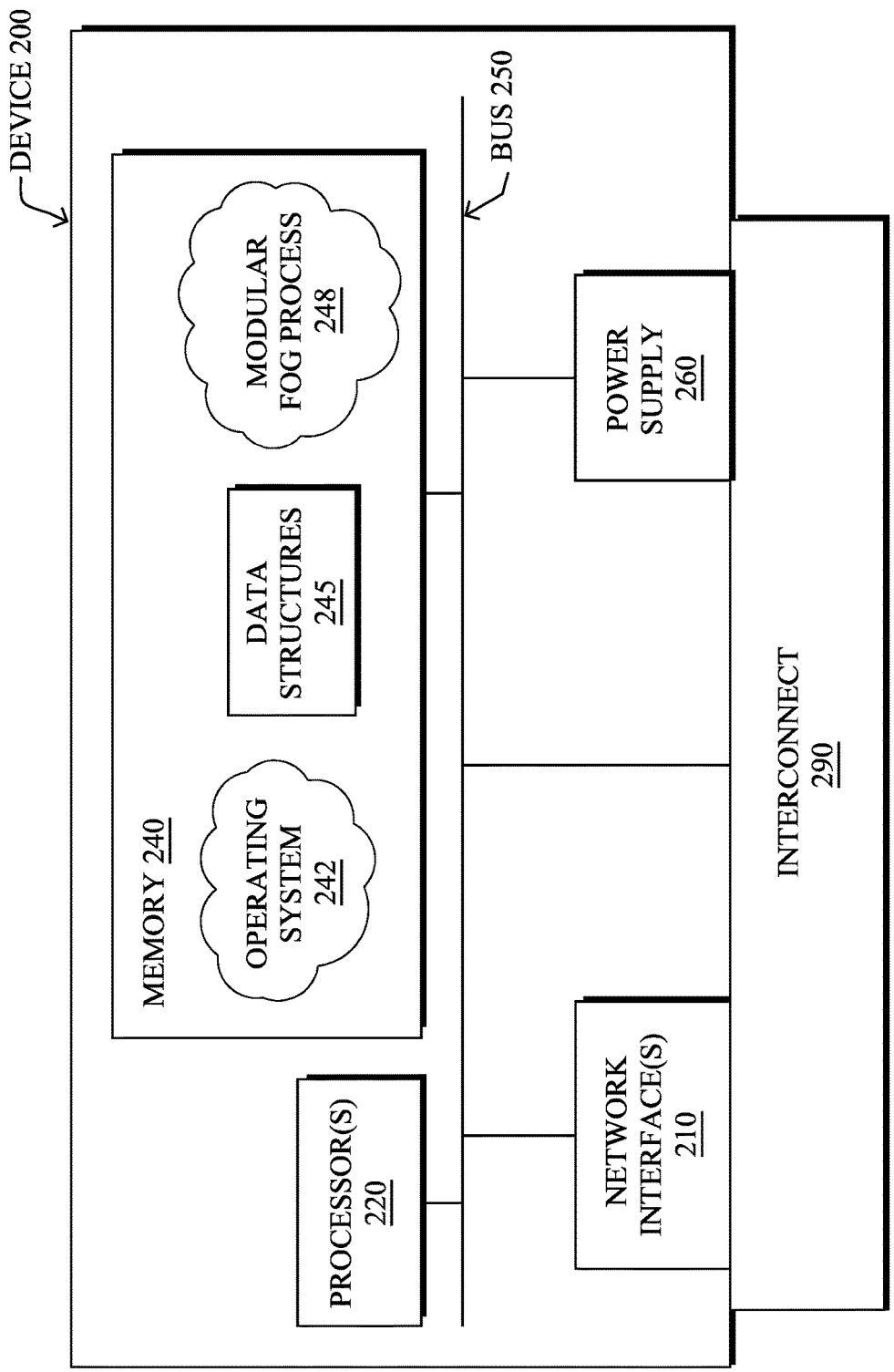
FIG. 2 illustrates an example computing device.

FIG. 2 is a schematic block diagram of an example computing device 200 that may be used with one or more embodiments described herein e.g., as any of the devices shown in FIG. 1 above, and particularly as either the autonomous carrier 140 and/or fog module 150, and also fog node 122, as described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections (for fog modules 150), and that the view herein is merely for illustration. Also, while the network interface 210 is shown separately from power supply 260, for fog modules using power-line communication (PLC) or Power over Ethernet (PoE), the network interface 210 may communicate through the power supply 260, or may be an integral component of the power supply. In some specific configurations the PLC/PoE signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative "modular fog" process 248, as described herein.

Note that as described below, one or more interconnects 290 may also be present on the device 200, such as various mechanical and/or electrical interconnects to allow interconnection between, e.g., an autonomous carrier 140 and a fog module 150, a fog module 150 to other fog modules 150, or a fog module 150 and a fog module enclosure, described below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—On-Demand Modular Fog Computing Resources—

As noted above, current proposals and implementations of fog computing are generally static in nature, where the fog network is designed and implemented prior to providing a set of pre-defined services (e.g., connectivity to cloud, data analytics, etc.). That is, the fog network as it stands today describes deployment options that assume a static or semi-static fog node that, while it might have modular compute capability, is designed to be installed at a fixed location. As also mentioned above, many of fog's IoE applications require high availability and/or nonstop operation, and the need to provide compute, networking, and storage resources to the network edge may not always be trivial. Moreover, adding and maintaining high-capacity fog resources in support of applications like smart cities, connected transport or industrial automation traditionally requires significant human intervention to install, modify, repair, expand or upgrade fog nodes, and physical access to secure internal spaces, which adds to installation cost and ongoing operational expenses (OPEX).

What is needed therefore is a faster, more efficient way to deploy and maintain fog nodes. This efficiency gain is valuable during initial deployments of large-scale permanent fog networks, during their on-going upgrade and maintenance, and to quickly roll out temporary fog nodes to cover network hot spots and special events. Further, for fog to be truly valuable in critical infrastructure applications, methods of repairing, upgrading, or supplementing the hardware of an individual fog node without causing a service outage must be provided.

The techniques herein, therefore, provide for on-demand modular fog computing resources. Specifically, according to one or more embodiments of the disclosure as described in detail below, an autonomous carrier transports a fog computing module to an enclosure at a location determined to be in need of a particular fog computing resource, and aligns and anchors the fog computing module to the enclosure, where the aligning and anchoring is based on mating mechanical connectors on the fog computing module and enclosure. One or more electronic components of the fog computing module may then interface to the enclosure due to the anchoring, and the fog computing module activates at the location, accordingly. In one particular embodiment, the particular fog computing resource of the fog computing module is an additive resource to an existing fog computing resource module at the enclosure, and the existing fog computing resource module provides the mechanical connectors and interfaced electronic components of the enclosure.

For example, as described in greater detail below, the techniques herein provide a novel mechanical arrangement, electrical interconnect structure, and software design that allows a fog node to be established and activated on-demand. In one example embodiment, to replace or supplement a fog node that has suffered a failure or overload with a new fog node, e.g., manually or autonomously (such as by land-based or water-based robot systems, or drones or unmanned aerial vehicles, or "UAVs"). In this embodiment, the new fog node intercepts the input/output (I/O) and support connections to the old fog node, and can take the entire node's load (in case of a replacement), or a portion of the old node's load (in order to supplement capacity). In another example embodiment, a mobile fog node may be a "rolling fog node" that is a fairly high capacity modular platform for compute, networking, and storage that is optimized for rapid deployment and robotic maintenance. A special vehicle (which could be autonomous) can carry, set down, and install the mobile fog nodes, and also use on-board robotic equipment to provide upgrades and maintenance.

Illustratively, the techniques described herein may be performed by hardware, software, and/or firmware, such as in accordance with the "modular fog" process 248, which may contain computer executable instructions executed by the processor 220 to perform functions relating to the techniques described herein, e.g., on a fog module 150 as a fog computing resource process, on a fog node delivery device (autonomous carrier) 140 as a fog module transport process, or otherwise. In other words, depending upon the particular configuration of the device 200 shown above, the illustrative "modular fog" process 248 may be configured appropriately to execute the functions related to that specific device, accordingly.

Figure 3:
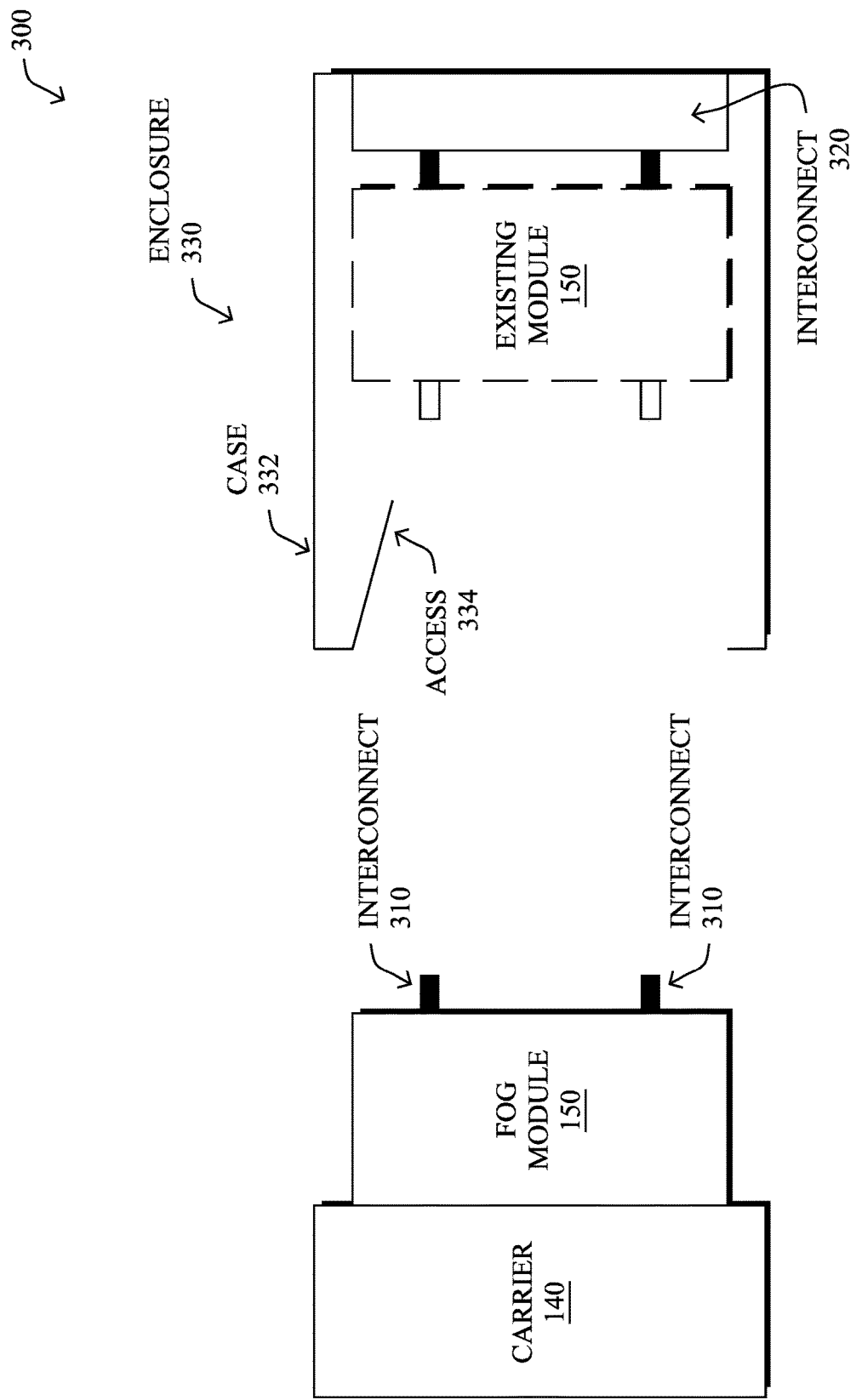
FIG. 3 illustrates an example view of a system for on-demand modular fog computing resources.

Operationally, and with general reference to FIG. 3, the techniques herein create a flexible fog network by having a mobile autonomous carrier 140 (e.g., a drone, UAV, robot, truck, watercraft, etc.) provide fog modules 150 for fog computing resources, such as compute, storage, and communication services. In particular, the system 300 uses a combination of mechanical, hardware, and software techniques as described herein to provide a method of repair of a partially-failed fog node, seamless on-line upgrade of fog nodes or their modular elements, and an easy way to temporarily add additional fog node capacity in parallel with existing nodes. For example, the techniques herein can be used in (or to create) a network of geographically disbursed fog nodes, where fog nodes/modules can be brought online quickly, e.g., supporting critical applications or addressing capacity hot spots through the temporary installation of portable supplementary fog modules alongside primary modules (e.g., to help them manage their processing, storage, or networking capacity issues). The techniques herein can also provide "fog as a service" (FaaS), where the fog network is flexible and mobile in nature that can be used to provide service-based subscriber packages (e.g., cloud connectivity, location-based services, local data analytics, etc.).

As shown in FIG. 3, an autonomous carrier 140 (or, notably, a manually moved carrier) may transport a fog module 150 to a location determined to be in need of a particular fog computing resource for which the fog module 150 is configured (as described in greater detail below). Note that the size of the fog module and/or the location of the enclosure 330 may dictate the type of autonomous carrier to use. For example, for vastly larger resources with sizes or weights beyond the reasonable capacity of a UAV, a truck or other vehicle may be used as the carrier (e.g., for "rolling fog" as mentioned below, in order to provide high-capacity, modular, and mobile fog nodes for specific use cases).

The fog module 150 may have a set of mechanical and/or electrical interconnects 310 that mate (align/anchor) with reciprocal interconnects 320 of an enclosure 330 or existing fog modules 150, as detailed below. The enclosure 330, such as a roadside module receptacle, a pole-top module receptacle, a building-top module receptacle, a building-side garage-based module receptacle, or any other suitable enclosure configuration, may comprise an outer enclosure casing 332 (e.g., weatherproof, tamper-proof, etc.), and an access panel 334 on the outer enclosure casing (e.g., accessible only by an authorized autonomous carrier 140). The reciprocal interconnects 320 may comprise mating mechanical connectors and interfacing electronic components, which are accessible to the authorized autonomous carrier via the access panel, and, as described below, are configured to provide mechanical alignment and anchoring of a fog computing module 150 by the authorized autonomous carrier and also sufficient electrical power to activate the fog computing module. Other connections, such as network connections and so on, may also make up the interconnects 320 as described herein.

Figure 4A:
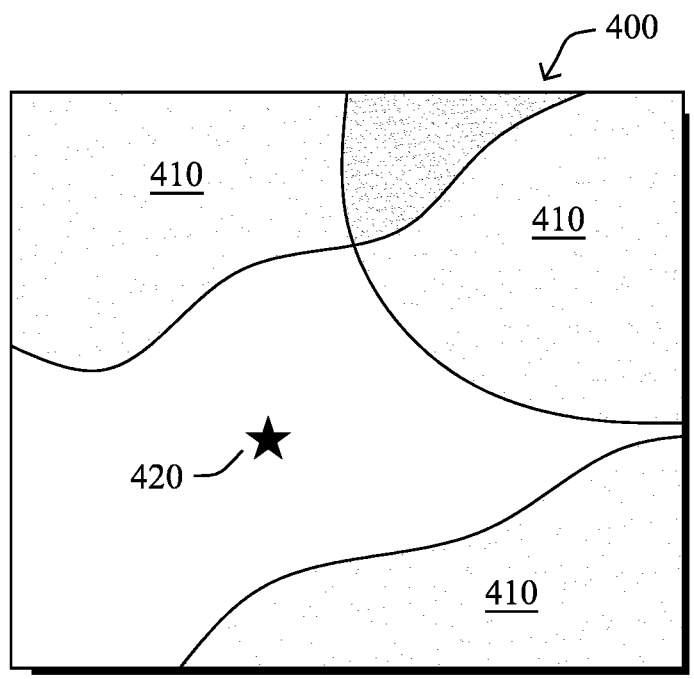
FIGS. 4A-4B illustrate an example of determining a need and location for on-demand modular fog computing resources.
Figure 4B:
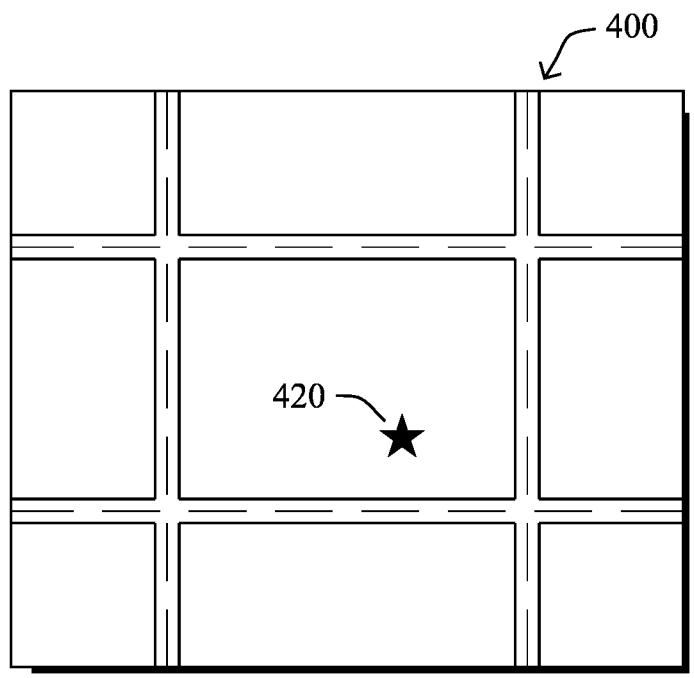

According to one or more embodiments of the techniques herein, it is important to determine a location where fog resources are needed, such that the necessary fog module(s) may be transported to such locations. For instance, as shown in FIGS. 4A-4B, various regions of an area 400 may have fog resource coverage 410, leaving locations 420 where fog resources are needed. Needs may arise, for example, where there is a subscribed location for FaaS, or else determined locations of increased fog activity, reduced fog capability, failed fog capability, insufficient fog capability, a newly offered fog capability, and so on. For instance, in addition to maintenance of fog resources or carrier-based installation/expansion of services, owners of buildings, roadways, railroads, factories, entertainment venues, etc. may wish to contract a FaaS service provider to provide various fog capabilities that are needed (e.g., similar to the relationships they may have with their Cloud Service Provider). The techniques herein, therefore, can provide tempestuous, semi-permanent, and permanent fog resources, and can provide boosts to existing fog deployments.

The fog module transport device (carrier 140) illustratively has three autonomous capabilities. First, it can deliver a pre-configured fog module 150 to a prepared enclosure 330 in the field that accepts it for permanent, semi-permanent, or temporary installation. (Note in one embodiment, the enclosure with one or more pre-installed fog modules 150 may be carried by the carrier 140). A second mode leaves the fog modules 150 attached to the autonomous delivery vehicle 140, such as for temporary applications or for embodiments where the fog module 150 is autonomously transportable (i.e., the carrier 140 and the fog module 150 are an integrated device). The third capability involves the use of on-board robotic equipment of the carrier 140 (e.g., similar to a bomb disposal robot) that can open an enclosure 330 and install/replace fog modules 150 to perform repairs and/or upgrades.

Notably, the fog module's packaging, mechanical anchoring, connectors, cooling, and configuration automation support a full installation herein without any human touch. Accordingly, the vehicle delivering the fog module may "back into" the fog module's intended location (e.g., a street-side pad, garage in a building, position on a railroad, corner of a factory, etc.) and release the module from its chassis, leaving the fog module fully installed and operational. In another embodiment, robotic repair or upgrading on previously installed fog modules may also be performed in a similar manner, where robotic tools on the vehicle 140 are moved into the vicinity of the existing module. The vehicle can then "unlock" the module's enclosure, use its robotics to remove failed or obsolete modules, and install new modules in their place. Once the robotic maintenance is complete, the outer enclosure may be sealed and the vehicle moves on to its next assignment. Note that these modules 150 are thus designed with connectors and/or "handles" (interconnects 290) to facilitate transport and/or robotic manipulation.

Figure 5:
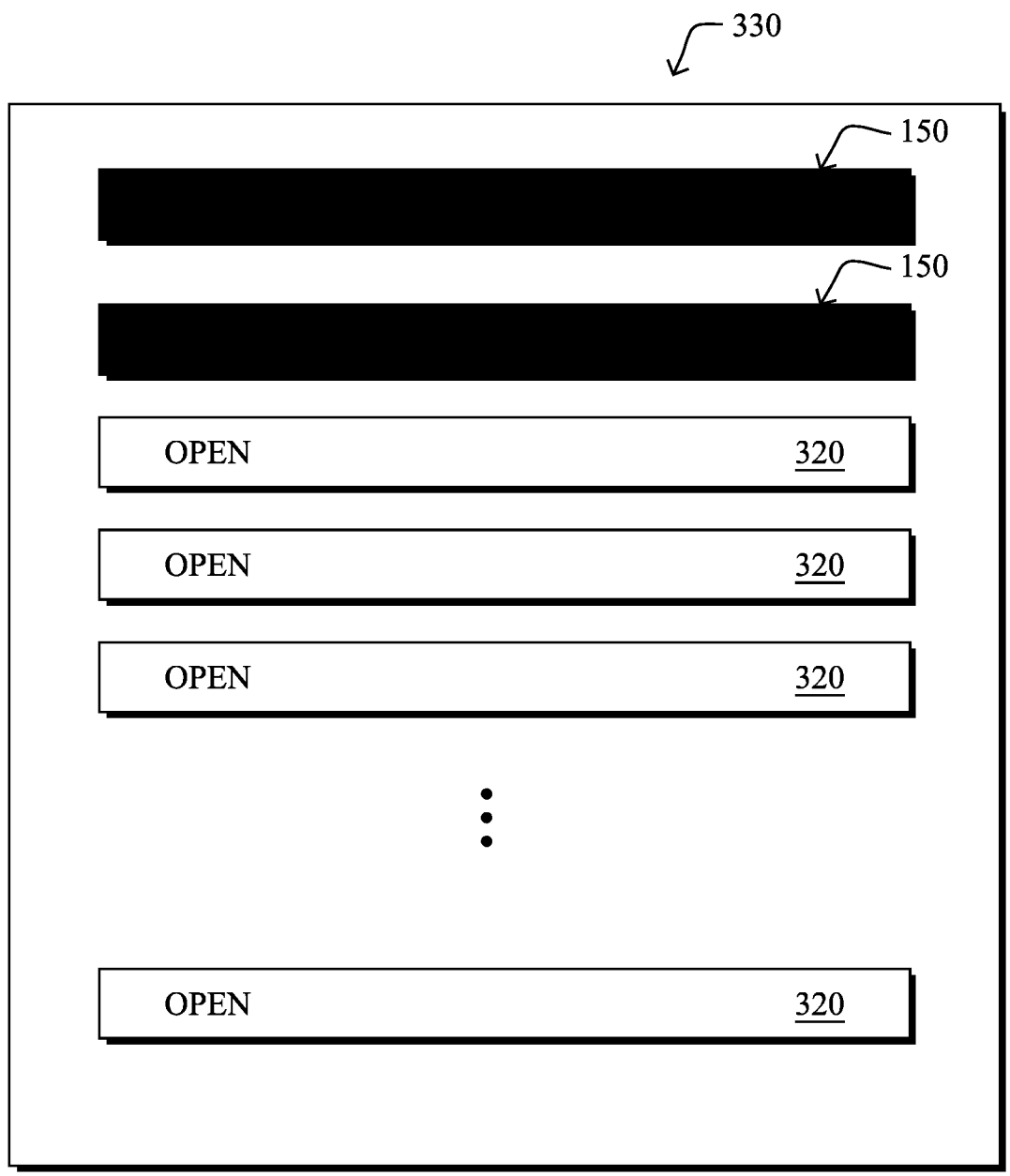
FIG. 5 illustrates an example enclosure for on-demand modular fog computing resources.

FIG. 5 illustrates an example of an enclosure 330 having multiple interconnects (e.g., ports) 320 for receiving multiple fog modules 150 in accordance with the techniques herein. In one embodiment, the fog node enclosures are physically sized according to their suitable purpose and environment (e.g., about half of a standard data center rack), and may hold a suitable number of modules (e.g., one to ten). In certain embodiments, each module port could serve to interface with a fog module 150 having a separate purpose (e.g. providing computation, networking, or storage functions), and the modules would thus be interchangeable and configurable in many different combinations to construct fog nodes with different capabilities. Alternatively or in addition, multiple module slots within an enclosure 330 may interface with similar fog modules, such as to boost/amplify the computation, storage, networking, I/O, power, cooling, etc. within the enclosure in any required combination.

Figure 6A:
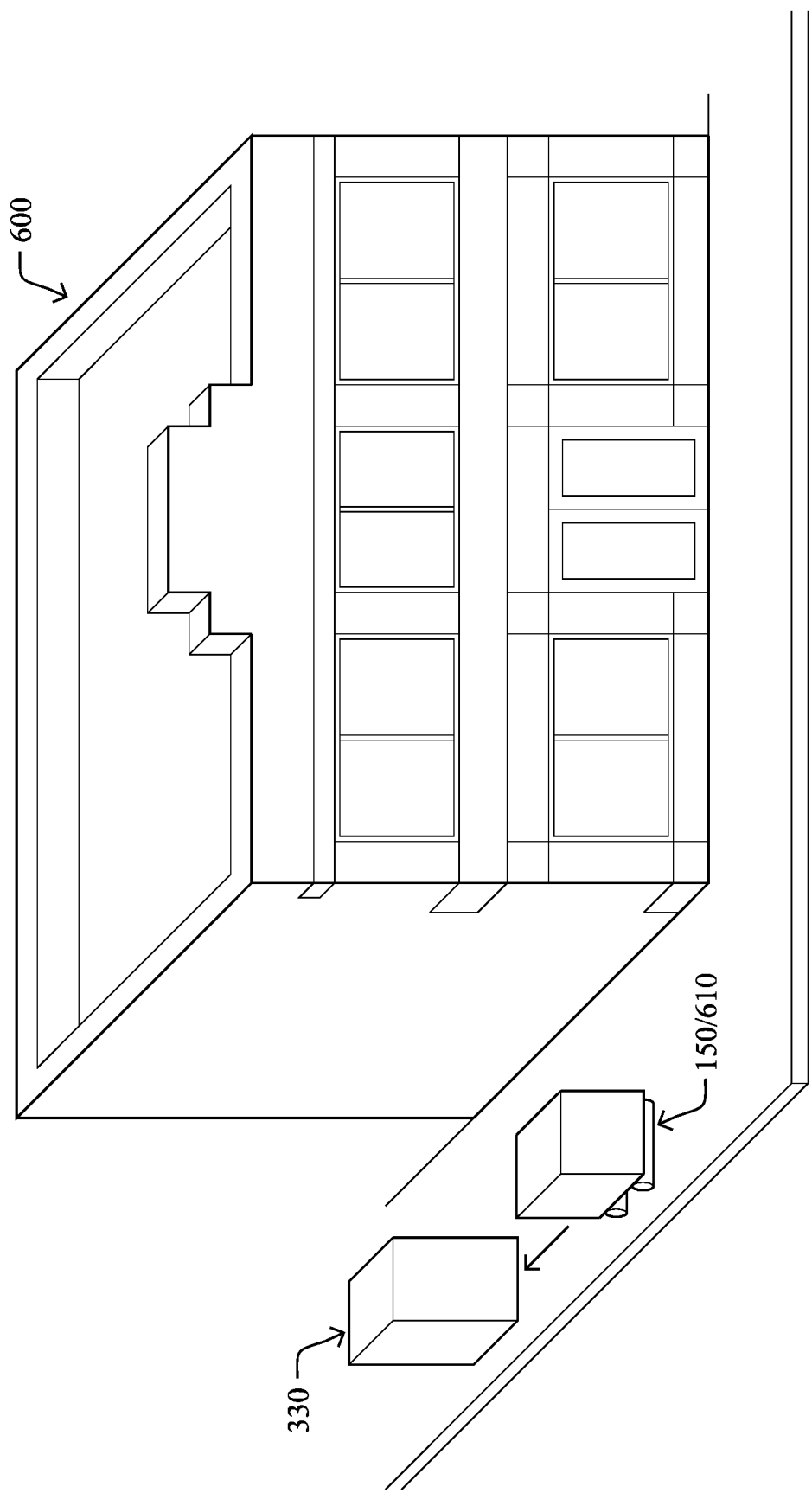
FIGS. 6A-6C illustrate an example of enclosure locations for on-demand modular fog computing resources.
Figure 6B:
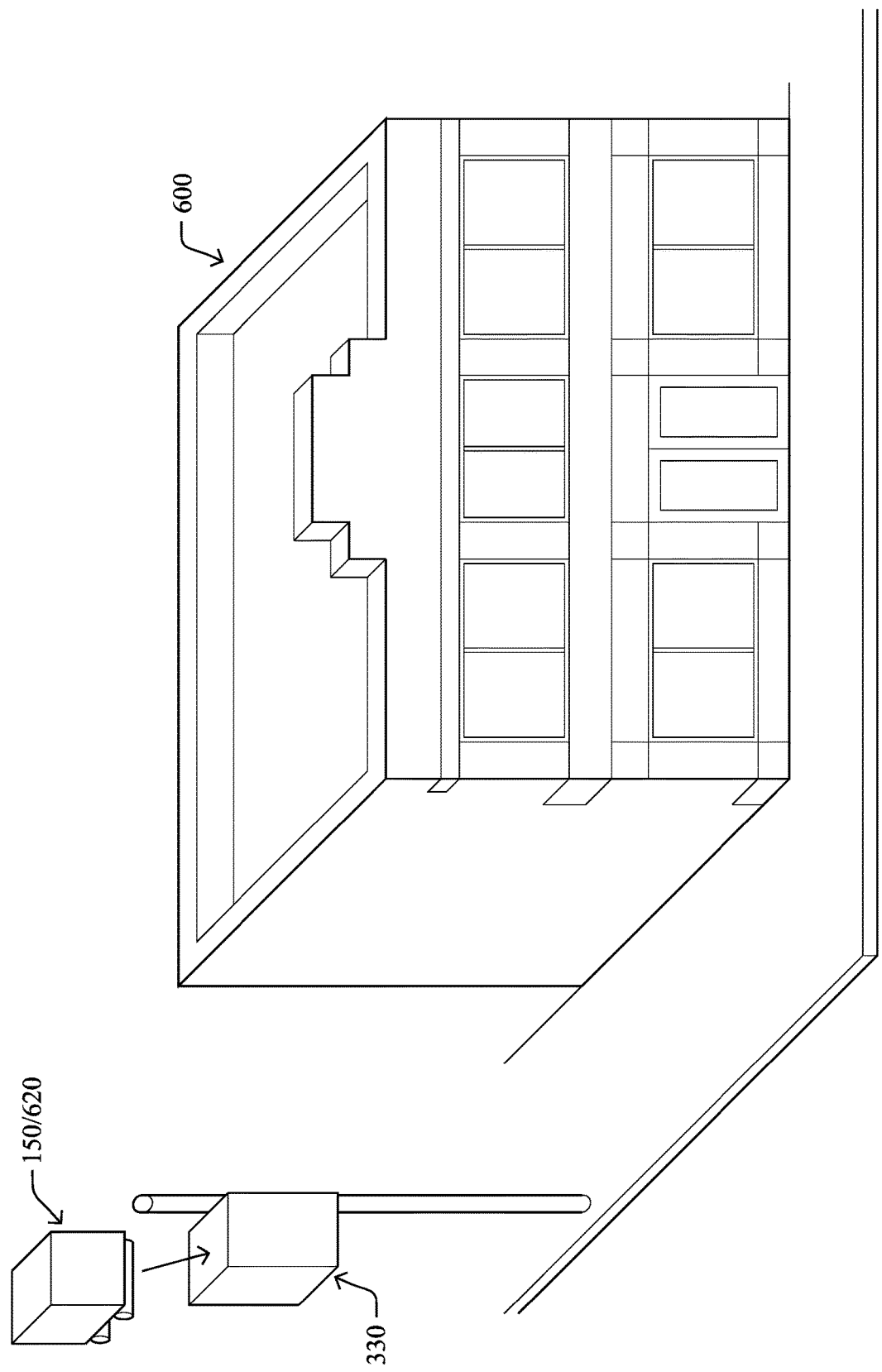
Figure 6C:
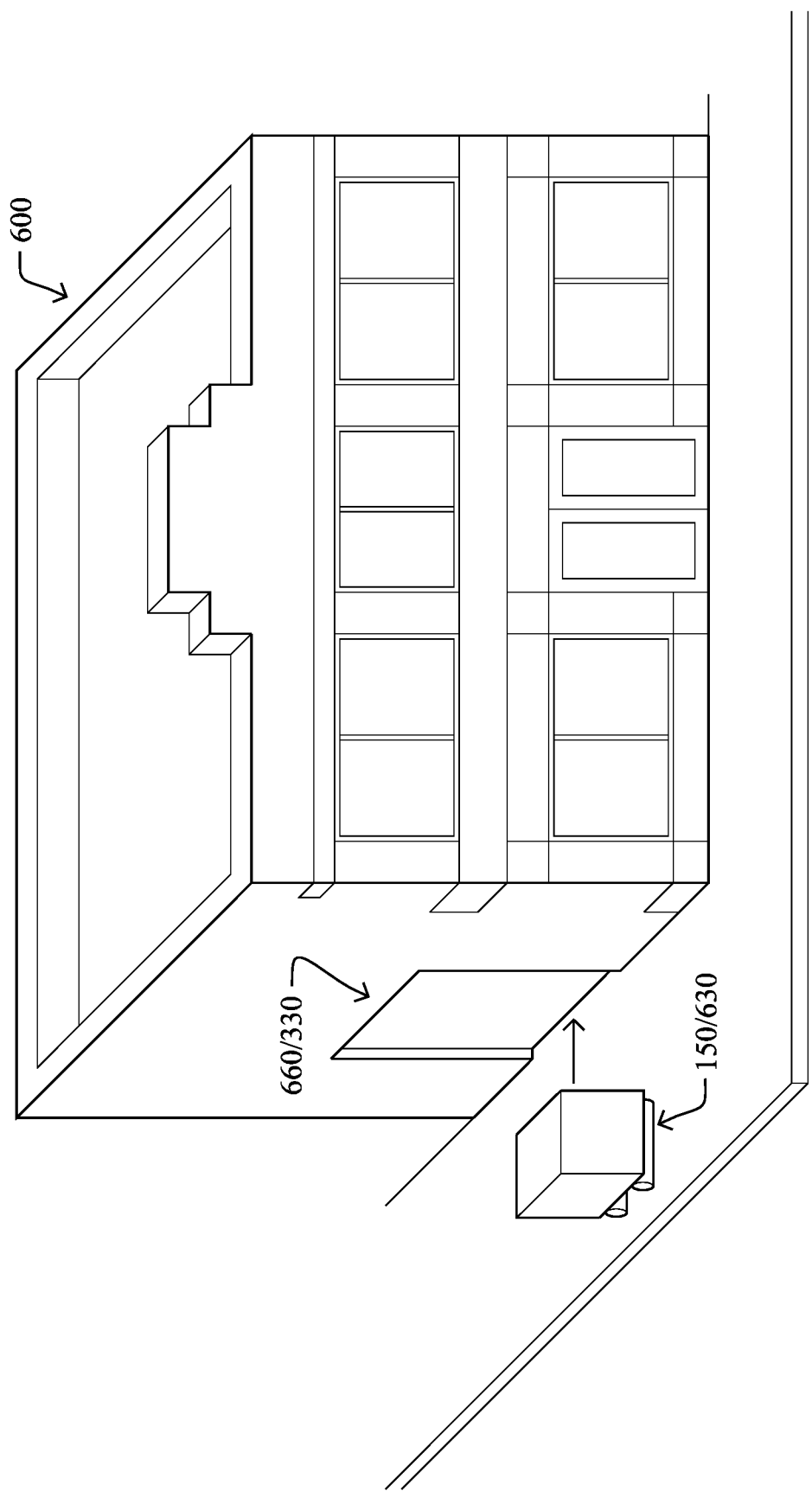

FIGS. 6A-6C illustrate example of various environmental locations of enclosures 330 (e.g., in a city-like environment, though any suitable environment may benefit from fog modules as described herein), where fog module enclosures 330 serve as pre-configured, secure landing places for fog modules 150 in deployment scenarios like smart buildings, streetside/railside cabinets for smart transportation, and municipal fog nodes for smart cities. For instance, as shown in FIG. 6A, a fog module 150 may be delivered by an autonomous vehicle 610 (a type of carrier 140) to a road-side cabinet enclosure 330 (e.g., by a land-based carrier, though an aerial carrier may also be used). The fog module 150 may then be installed in that enclosure and any available power supply of the enclosure (e.g., plug-in, solar, etc.). Alternatively, a pole-top enclosure 330 is shown in FIG. 6B, where a drone or UAV 620 as the carrier 140 could "perch" upon the enclosure 330 to supply/maintain the fog module(s) 150 therein.

In still another embodiment, as shown in FIG. 6C, fog-enabled buildings can provide a small, secure garage 660 next to or integrated within the structure for a mobile carrier. For instance, the fog module may thus be delivered by an autonomous vehicle 630 (carrier 140) (which rolls up on the street or sidewalk, and accesses the secure fog space via the garage door). The fog module 150 may then be installed in that garage and cabled to power, Internet, cooling, as well as wired to all the building systems. Once the "landing spot" in the garage is prepared for the standardized fog module, robotic equipment can manage all operations. An external contractor or FaaS provider could be responsible for rolling the fog node into the garage initially, and performing ongoing upgrades and repairs, all via the autonomous service vehicle without ever needing access to the inside of the building. Building owners can thus outsource all the building's fog functions (including energy management, security, safety, lighting, signage, thin client, etc.) to a company who can service the infrastructure by simply rolling up an autonomous vehicle, commanding the building to open the fog garage door, and performing whatever installation, upgrade or maintenance functions may be required.

Figure 7:
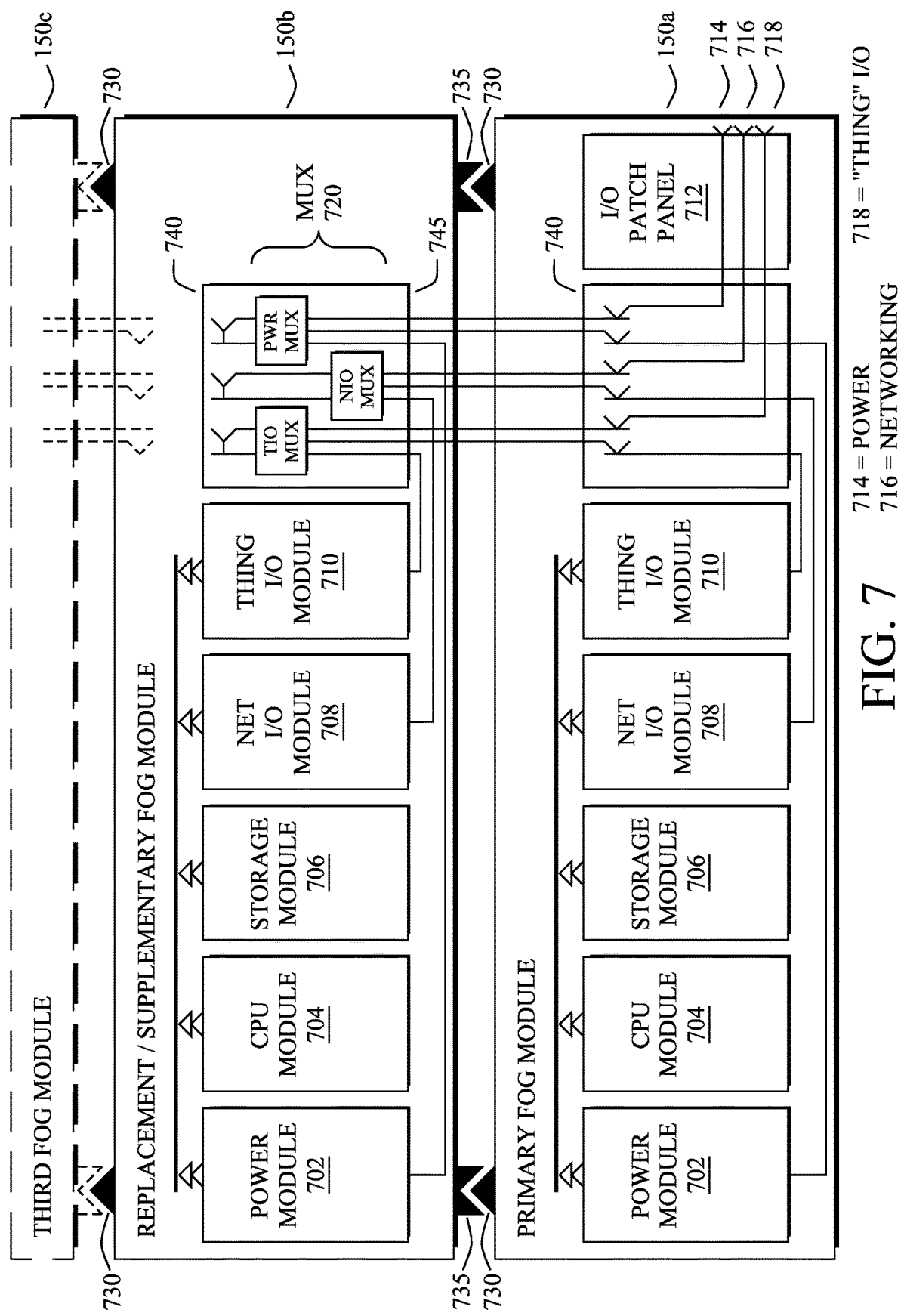
FIG. 7 illustrates an example representation of electrical and mechanical components for on-demand modular fog computing resources.

FIG. 7 illustrates a detailed view of one illustrative embodiment of the interconnect between fog modules 150 and other modules or the enclosure 330. Mechanically, as mentioned above, the system herein may consist of a special enclosure 330 capable of holding a primary fog module in each port/interconnect 320. Notably, in addition to being configured to receive a portable fog module in a separate port, the techniques herein also allow for "piggy-backing" modules on top of each other. For example, as shown in FIG. 7, a primary fog node 150a (shown on the bottom) includes all of the power infrastructure 702, CPUs 704, storage 706, networking I/O 708, and direct Thing I/O interfaces 710 (to connect local sensors and actuators, either wired or wireless) needed to support all of its applications under usual load. An I/O patch panel 712 is illustratively configured to interconnect directly with the enclosure 330 to receive various electronic interfaces, such as power I/O 714, networking I/O 716, IoT "thing" I/O 718 (e.g., sensing and/or actuating I/O), etc. (For example, as described above, I/O patch panel 712 may be configured with an interconnect 320 to interface with an interconnect 320 of the enclosure.)

The mechanical alignment/retention structures 730 of the primary fog module 150a may be configured to mate with reciprocal structures 735 of the second (e.g., replacement/supplementary) fog module 150b. Electrical interfaces 740 of the primary module 150a may also interconnect with correspondingly reciprocal electrical components 745 of the second fog module 150b. This arrangement may continue to connect/stack one or more replacement/supplementary fog modules (e.g., third module 150c and so on) as needed.

In one embodiment, the mechanical alignment structures 730/735 may employ latches, keying, and interlocks so that they can only be activated by a legitimate portable fog module (e.g., preventing someone with a dummy stacking connector from inserting it and shutting down the primary node). The mechanical alignment structures, when correctly mated, may operate linkages that open weatherproof shutters that protect the connectors and internal components of the primary fog module.

Further, in one embodiment, the primary fog module's expansion socket is usually empty, with the local electrical signals passing through the connectors 740 in their default "shorted" state, but when the primary fog module needs to be serviced or supplemented, a portable fog module is moved up and plugged into it. Special connectors 745 may insert the portable fog module in series before the primary node in its power 714, Internet links (optical or electrical) 716, and wired sensor/actuator interfaces 718. In this example embodiment, these connectors automatically interrupt the signals flowing inside the primary fog node, and insert the analogous signals from the portable fog module in series with them. When the hardware detects the presence of a newly-installed portable fog module in this manner, it may wait for the portable/additional module to boot and then transfers its network and downstream Thing traffic from the primary to the portable node. This transfer may be made by switching the state of the three sets of multiplexors (MUX 720, generally) on the replacement fog module. When the replacement Node is first plugged in, but not yet booted or context updated, the multiplexors may maintain continuity through the primary fog module. Once the replacement node is ready to support the load, the multiplexors may switch states, directing the signals first through the replacement module and then back to the primary module (if at all).

Note that as shown, the primary fog node 150a has an I/O patch panel 712 configured to interconnect directly with the enclosure 330, however, in alternative embodiments, each of the fog modules 150 may have similar configurations for interconnectability, that is, the enclosure may have the same mechanical and electrical interconnects 320 (730/740, respectively) shown for receiving the additional fog modules 150b etc., and as such, the primary fog module 150a may have the correspondingly reciprocal interconnects 310 (735/745).

In certain embodiments, upon connection, the storage and application context may be synchronized from the primary module to the portable module in a way that causes minimum application disruption as the processing responsibility is moved between fog nodes. Then the primary node can be either shut down for repair or upgrade, or else its capacity may be made available alongside the portable node to temporarily double the fog processing, storage, and networking capacity of a location. Even if the primary module is experiencing a severe failure, it may still be possible for the portable module to reach inside it to retrieve important data, logs, or context.

Notably, if the mechanical and stacking interfaces are designed correctly, the portable fog modules could be rapidly installed by an autonomous vehicle (or manually by a human), permitting hands-off repair or capacity enhancement (again, using keying used to prevent unauthorized node insertion and removal). Rapid, robotic replacement of failed fog modules/nodes by UAV or autonomous land vehicles allow for repair and capacity adjustments to be made rapidly (e.g., sub 30-minute response time) by automatically moving supplementary fog modules between the various locations in a region to repair malfunctioning modules and/or supplement modules that are experiencing the highest load at the moment. Note that physically moving portable fog modules is also a way to move very large data sets (surveillance video, movies on demand, terabytes of sensor readings, etc.) between a central depot and the specific locations where they are needed. These new nodes become plug-and-play as well, thus obviating the need for expensive resources to be used to deploy them.

Figure 8:
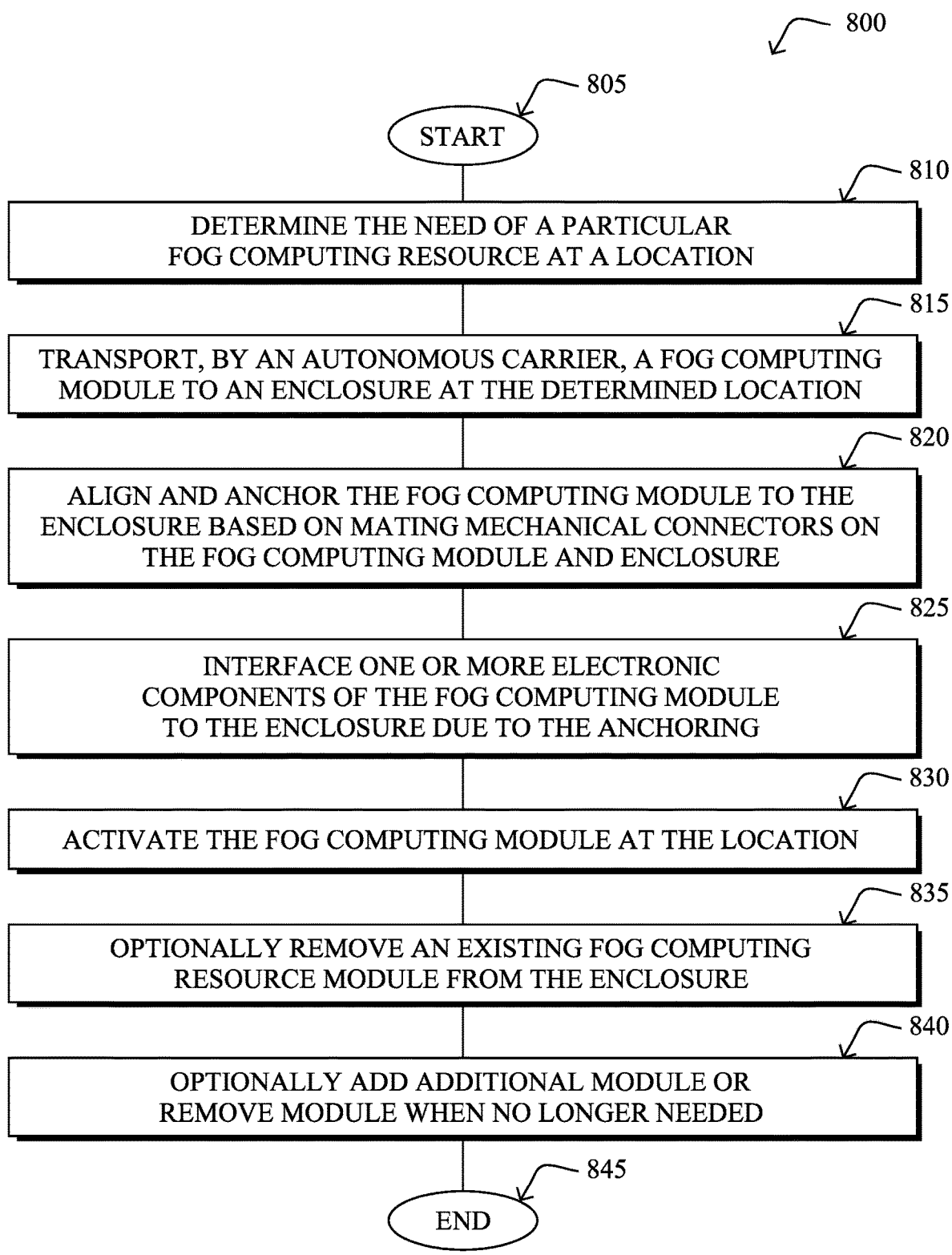
FIG. 8 illustrates an example simplified procedure for on-demand modular fog computing resources.

FIG. 8 illustrates an example simplified procedure for on-demand modular fog computing resources in accordance with one or more embodiments described herein. The procedure 800 may start at step 805, and continues to step 810, where, as described in greater detail above, a need for a particular fog computing resource is determined, and in a particular location. For instance, as mentioned above, the particular fog computing resource may be a portion of a fog computing solution provided at an enclosure 330, or else may be an entire fog computing solution (such that a needed fog computing module provides a portion of or the entire fog computing solution as needed). Many factors could be considered by modular fog process 248 to determine the need for changes to the resources at a particular location, including processor load, storage capacity limits, network occupancy, user count, new applications, or predicted failures.

In step 815, an autonomous carrier 140 transports an appropriate fog computing module 150 to an enclosure 330 at a location 420 determined to be in need of the particular fog computing resource. As noted, the autonomous carrier can be any suitable transportation mechanism, such as a robot, a drone, a UAV, an autonomous vehicle, or other suitable transport device, and the enclosure can be a roadside module receptacle, a pole-top module receptacle, a building-top module receptacle, a building-side garage-based module receptacle, and so on.

In step 820, the fog computing module 150 is aligned and anchored to the enclosure 330 by the autonomous carrier 140, where, as mentioned above, the aligning and anchoring are based on mating mechanical connectors 730/735 (e.g., keyed connectors) on the fog computing module and enclosure. Also, in step 825, one or more electronic components of the fog computing module 745 are interfaced to the enclosure 330 (reciprocal electrical components 740) due to the anchoring. Note that as detailed above, in one embodiment the particular fog computing resource of the fog computing module may be an "additive resource" to an existing fog computing resource module at the enclosure, such that the existing fog computing resource module provides the mechanical connectors and interfaced electronic components of the enclosure. As also mentioned above, the additive resource may be a repair module to repair the existing fog computing resource module, a replacement module to replace the existing fog computing resource module, a support module to amplify one or more capabilities of the existing fog computing resource module, and so on. Moreover, as detailed above, electronically inserting the electronic components 745 of the fog computing module 150 may occur in series between a source of the electronic components at the enclosure and associated electronic components 740 of the existing fog computing resource module, where the electronically inserting breaks a direct connection between the electronic components of the existing fog computing resource module and the source of the electronic components at the enclosure (see, e.g., FIG. 7). This can preserve functionality until a more convenient time is found to remove the failed fog computing module 150.

In step 830, the fog computing module 150 activates at the location, and may transfer data and/or state to/from an existing fog computing module, as mentioned above. Note that during operation, the activated fog computing module may also multiplex electronic connectivity between the source of the electronic components at the enclosure and to one or both of the electronic components of the fog computing module and the electronic components of any existing fog computing resource module.

Optionally, in step 835 an existing fog computing resource module may also be removed from the enclosure, preferably after activation of the replacement, since removal of an active module before a replacement is installed can cause a service interruption (however this is not a necessary order, since in some instances, there may be no option to install a replacement until an active/failed module is removed).

Also optionally, in step 840, an additional fog computing resource module may be further added to the fog computing module, or else when the need of the particular fog computing resource is only temporary, the fog computing resource module may be removed from the enclosure when it is no longer needed.

The illustrative procedure 800 may then end in step 845.

Figure 9:
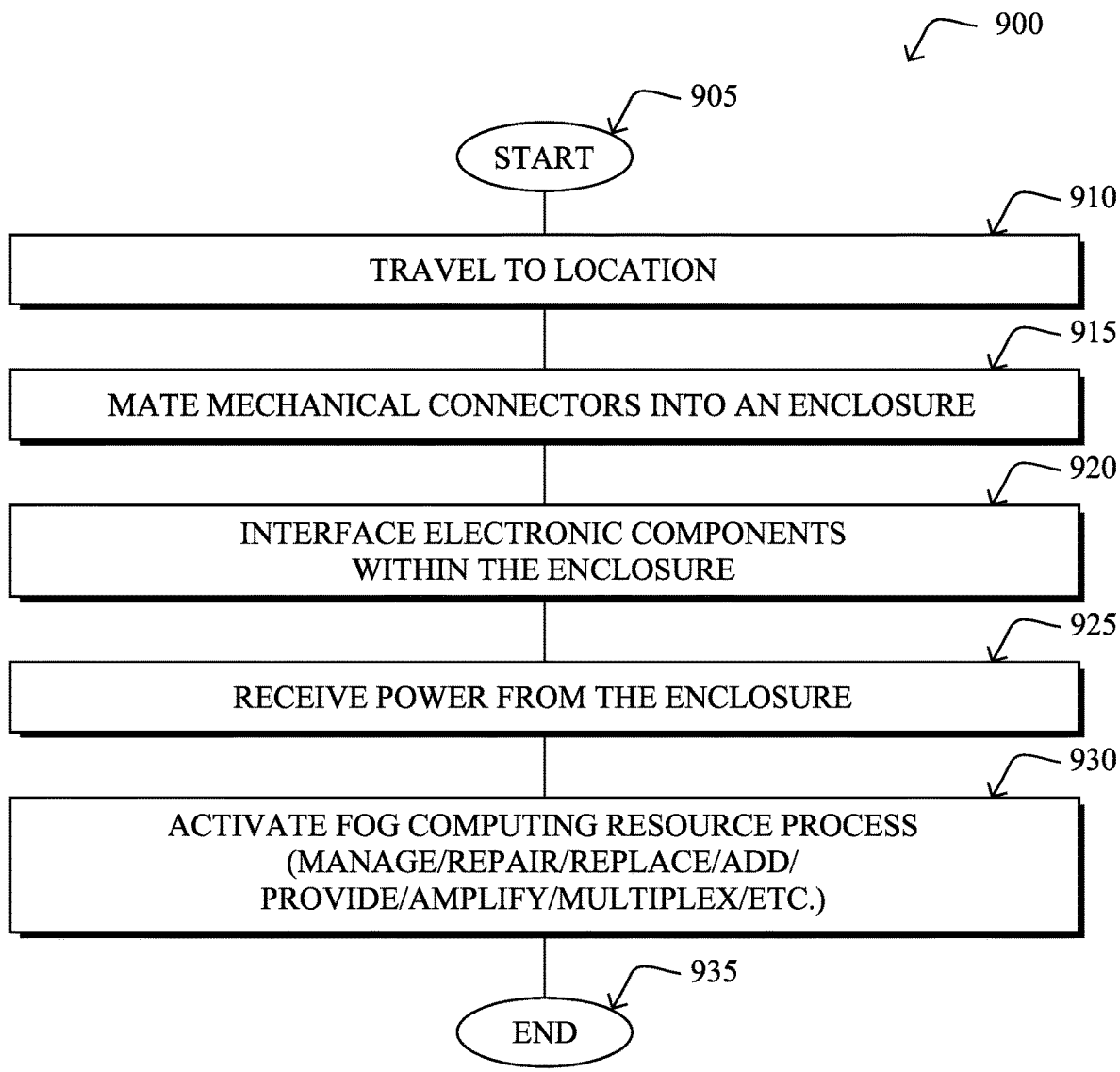
FIG. 9 illustrates an example simplified procedure for on-demand modular fog computing resources, particularly from the perspective of a fog module.

In addition, FIG. 9 illustrates an example simplified procedure for on-demand modular fog computing resources in accordance with one or more embodiments described herein, particularly from the perspective of a fog module. The procedure 900 may start at step 905, and continues to step 910, where, as described in greater detail above, the module 150 travels to a particular location (e.g., is carried by autonomous carrier 140 or a human), where in step 915 the module mates its mechanical connectors to those of the enclosure to provide alignment and anchoring of the module. Also, in step 920, the module interfaces its electronic components with reciprocal electronic components within the enclosure (e.g., of the enclosure or of an existing module) due to the anchoring. Once receiving power in step 925 (unless on-board power is present), then in step 930 the module activates to provide its fog computing resources at the location (e.g., managing an existing module, repairing an existing module, replacing an existing module, adding to an existing module, providing new resources, amplifying existing resources, multiplexing electrical connectivity between modules, etc.). The illustrative simplified procedure 900 may then end in step 935.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide for on-demand modular fog computing resources. In particular, the techniques herein provide installation, reconfiguration, and maintenance of fog nodes with practically no direct human intervention, efficiently and in a versatile manner, resulting better times-to-service and capital expense (CAPX) and operational expense (OPEX). For instance, the techniques herein mobilize the fog layer to accommodate needs for storage, compute, and communication services in any needed location, for any short-lived events or long-term solutions. The time to install a first service and the time to repair or supplement are substantially reduced (e.g., down from 4-8 hours to 5-30 minutes), and quality of work will be substantially improved (and costs reduced) by leveraging autonomous capabilities as compared to more human labor intensive traditional techniques according to the techniques herein. Applications may also experience a limited interruption during a full node replacement, such as for less than one second under most repair or capacity expansion scenarios. Furthermore, the portability of supplementary nodes can also be used to transfer large data sets faster than limited network throughput may allow, as mentioned above.

Notably, the techniques herein are unique from traditional "mobile resources" because they define a special combination of mechanical, hardware, and software techniques to allow the seamless transportation, repair, or upgrade of complex systems, with much less effort (potentially being completely autonomous) than would be traditionally required. They also allow temporary stacking of two or more nodes to enhance fog capacity in hot spots.

While there have been shown and described illustrative embodiments that provide for on-demand modular fog computing resources, it is to be understood that various other adaptations and modifications may be made within the spirit and scope of the embodiments herein. For example, the embodiments have been shown and described herein with relation to specific network configurations (orientations, topologies, protocols, terminology, etc.), and particularly to "fog" computing. However, the embodiments in their broader sense are not as limited, and may, in fact, be used with other types of networks and protocols, regardless of their nomenclature. In addition, while certain physical orientations may have been suggested by the figures, such as for mechanical and/or electrical interconnects, other suitable arrangements may be used, accordingly.

In addition, though the techniques herein reference an autonomous carrier 140 and a fog computing module 150, the embodiments herein may also provide for the fog computing module to be a part of an autonomous carrier (i.e., the fog computing module can autonomously "deliver itself" to an enclosure at any location determined to be in need of a particular fog computing resource). Moreover, though the description above may imply physical connectivity, such as for mechanical alignment and anchoring the fog computing module to the enclosure, or more particularly, for interfacing one or more electronic components of the fog computing module to the enclosure, various embodiments herein allow certain connectivity to be "un-touching", such as for wireless electrical component interfaces (e.g., short range high speed point-to-point wireless, infrared/optical communication, Wi-Fi, near-field communication, etc.). Mechanical mating for alignment and anchoring, also, may be based on un-touching technology, such as visual alignment, wirelessly sensed alignment, and so on.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    transporting, by an autonomous carrier, a fog computing module to an enclosure at a location determined to be in need of a particular fog computing resource;
    aligning and anchoring the fog computing module to the enclosure by the autonomous carrier, the aligning and anchoring based on mating mechanical connectors on the fog computing module and enclosure;
    interfacing one or more electronic components of the fog computing module to the enclosure due to the anchoring; and
    activating the fog computing module at the location.

2. The method as in claim 1, wherein the particular fog computing resource is a portion of a fog computing solution provided at the enclosure, and wherein the fog computing module provides the portion of the fog computing solution as the needed particular fog computing resource.

3. The method as in claim 1, wherein the particular fog computing resource is an entire fog computing solution provided at the enclosure, and wherein the fog computing module provides the entire fog computing solution as the needed particular fog computing resource.

4. The method as in claim 1, wherein the particular fog computing resource of the fog computing module is an additive resource to an existing fog computing resource module at the enclosure, and wherein the existing fog computing resource module provides the mechanical connectors and interfaced electronic components of the enclosure.

5. The method as in claim 4, wherein the additive resource of the fog computing module is selected from a group consisting of: a repair module to repair the existing fog computing resource module; a replacement module to replace the existing fog computing resource module; an upgrade to the existing fog computing resource module; and a support module to amplify one or more capabilities of the existing fog computing resource module.

6. The method as in claim 4, wherein interfacing comprises:
    electronically inserting the electronic components of the fog computing module in series between a source of the electronic components at the enclosure and associated electronic components of the existing fog computing resource module, wherein the electronically inserting breaks a direct connection between the electronic components of the existing fog computing resource module and the source of the electronic components at the enclosure.

7. The method as in claim 6, further comprising:
    multiplexing, by the fog computing module, electronic connectivity between the source of the electronic components at the enclosure and to one or both of the electronic components of the fog computing module and the electronic components of the existing fog computing resource module.

8. The method as in claim 4, further comprising:
    transferring, to the fog computing module, state from the existing fog computing resource module.

9. The method as in claim 4, further comprising:
    transferring data from the fog computing module to the existing fog computing resource module.

10. The method as in claim 1, wherein the autonomous carrier is selected from a group consisting of: a robot; a drone; an unmanned aerial vehicle (UAV); an autonomous vehicle; and an autonomous watercraft.

11. The method as in claim 1, wherein the enclosure is selected from a group consisting of: a roadside module receptacle; a pole-top module receptacle; a building-top module receptacle; and a building-side garage-based module receptacle.

12. The method as in claim 1, further comprising:
    removing an existing fog computing resource module from the enclosure prior to aligning and anchoring the fog computing module to the enclosure.

13. The method as in claim 1, further comprising:
    adding an additional fog computing resource module to the fog computing module to the enclosure by aligning and anchoring the additional fog computing module to the fog computing module based on mating second mechanical connectors on the fog computing module and the additional fog computing resource module, and by further interfacing the one or more electronic components of the fog computing module to corresponding electronic components of the additional fog computing resource module.

14. The method as in claim 1, wherein the mechanical connectors are keyed connectors.

15. The method as in claim 1, wherein the need of the particular fog computing resource is temporary, the method further comprising:
    removing the fog computing resource module from the enclosure when there is no longer a need of the particular fog computing resource.

16. The method as in claim 1, wherein the need of the particular fog computing resource is selected from a group consisting of: a subscribed location for fog as a Service (FaaS); a determined location of increased fog activity; a determined location of reduced fog capability; a determined location of failed fog capability; a determined location of insufficient fog capability; a determined location of an upgrade to an existing fog computing resource module; and a determined location of newly offered fog capability.

17. An apparatus, comprising:
a transportation mechanism;
a processor adapted to control the transportation mechanism and to execute one or more processes; and
a memory configured to store a process executable by the processor, the process when executed operable to:
transport, by the transportation mechanism, a fog computing module to an enclosure at a location determined to be in need of a particular fog computing resource;
align and anchor the fog computing module to the enclosure by the autonomous carrier, the aligning and anchoring based on mating mechanical connectors on the fog computing module and enclosure; and
interface one or more electronic components of the fog computing module to the enclosure due to the anchoring, wherein the fog computing module activates at the location upon interfacing the one or more electronic components.

18. The apparatus as in claim 17, wherein the particular fog computing resource is a portion of a fog computing solution provided at the enclosure, and wherein the fog computing module provides the portion of the fog computing solution as the needed particular fog computing resource.

19. The apparatus as in claim 17, wherein the particular fog computing resource of the fog computing module is an additive resource to an existing fog computing resource module at the enclosure, and wherein the existing fog computing resource module provides the mechanical connectors and interfaced electronic components of the enclosure.

20. The apparatus as in claim 17, wherein the apparatus and associated transportation mechanism is selected from a group consisting of: a robot; a drone; an unmanned aerial vehicle (UAV); an autonomous vehicle; and an autonomous watercraft.

21. The apparatus as in claim 17, wherein the enclosure is selected from a group consisting of: a roadside module receptacle; a pole-top module receptacle; a building-top module receptacle; and a building-side garage-based module receptacle.

22. An apparatus, comprising:
an outer enclosure casing;
an access panel on the outer enclosure casing, the access panel accessible by an authorized autonomous carrier;
mating mechanical connectors accessible to the authorized autonomous carrier via the access panel, the mating mechanical connectors configured to provide alignment and anchoring of a fog computing module by the authorized autonomous carrier, the aligning and anchoring based on reciprocal mating mechanical connectors on the fog computing module; and
one or more electronic components configured to interface with one or more reciprocal electronic components of the fog computing module due to the anchoring, wherein at least one of the one or more electronic components is configured to supply power to the fog computing module sufficient for the fog computing module to activate at a location of the apparatus and provide a particular fog computing resource at the location.

23. The apparatus as in claim 22, wherein the apparatus is selected from a group consisting of: a roadside module receptacle; a pole-top module receptacle; a building-top module receptacle; and a building-side garage-based module receptacle.

24. An apparatus, comprising:
a processor adapted to execute one or more processes;
a memory configured to store a fog computing resource process executable by the processor, the process when executed operable to provide one or more fog computing resources;
mating mechanical connectors configured to provide alignment and anchoring of the apparatus by an autonomous carrier into an enclosure, the aligning and anchoring based on reciprocal mating mechanical connectors within the enclosure; and
one or more electronic components configured to interface with one or more reciprocal electronic components within the enclosure due to the anchoring, wherein at least one of the one or more electronic components is configured to receive power from the enclosure sufficient for the apparatus to activate the fog computing resource process at a location of the enclosure.

25. The apparatus as in claim 24, wherein the fog computing resource process of the apparatus is an additive resource to an existing fog computing resource module at the enclosure, and wherein the existing fog computing resource module provides the reciprocal mechanical connectors and reciprocal electronic components within the enclosure.

* * * * *